United States Patent [19]

Pathe et al.

[11] Patent Number: 6,052,634
[45] Date of Patent: Apr. 18, 2000

[54] VEHICLE SAFETY DEVICE

[75] Inventors: Claude Pathe, Hery; Raphael Trousselle, Auxerre, both of France

[73] Assignee: Davey Bickford, Rouen Cedex, France

[21] Appl. No.: 08/930,516

[22] PCT Filed: Apr. 1, 1996

[86] PCT No.: PCT/FR96/00491

§ 371 Date: Jan. 2, 1997

§ 102(e) Date: Jan. 2, 1997

[87] PCT Pub. No.: WO96/30231

PCT Pub. Date: Oct. 3, 1996

[30] Foreign Application Priority Data

Mar. 31, 1995 [FR] France .................................. 95 03856

[51] Int. Cl.[7] .............................. G06G 7/76; B60R 21/32
[52] U.S. Cl. .................................. 701/45; 701/36; 701/29; 280/734; 280/735; 280/733; 180/274; 180/282; 340/436
[58] Field of Search .................................. 701/45, 29, 36; 340/438, 436, 439; 280/735, 730.2, 728.1, 733, 734; 307/10.1, 9.1; 180/282, 271, 274

[56] References Cited

U.S. PATENT DOCUMENTS

| 4,381,829 | 5/1983 | Montaron ..................................... 701/35 |
| 4,864,202 | 9/1989 | Nitschke et al. ......................... 280/732 |
| 5,023,468 | 6/1991 | Drobny et al. .......................... 307/10.1 |
| 5,068,640 | 11/1991 | Burger et al. ........................... 340/438 |
| 5,157,268 | 10/1992 | Spies et al. .............................. 307/10.1 |
| 5,475,269 | 12/1995 | Takeuchi .................................. 307/10.1 |
| 5,544,915 | 8/1996 | Fendt et al. ................................ 280/735 |
| 5,608,269 | 3/1997 | Fendt et al. ................................ 307/9.1 |
| 5,646,454 | 7/1997 | Mattes et al. ............................. 307/10.1 |
| 5,712,784 | 1/1998 | Fendt et al. ................................ 701/29 |
| 5,726,887 | 3/1998 | Spies et al. ................................ 701/29 |

FOREIGN PATENT DOCUMENTS

| 0 027 747 | 4/1981 | European Pat. Off. . |
| 0 649 776 | 4/1995 | European Pat. Off. . |
| 0 649 777 | 4/1995 | European Pat. Off. . |
| WO 88/05390 | 7/1988 | WIPO . |
| WO 89/09146 | 10/1989 | WIPO . |

OTHER PUBLICATIONS

A. Hartl et al., "Airbag Systems—Their Permanent Monitoring and Its Meaning to the User", *Vehicle Electronics in the 90's*, No.–, Oct. 1990, pp. 187–193.

S. Goch et al., "Inflatable Restraint System Design Considerations", *Vehicle Electronics in the 90's*, No. –, Oct. 1990, pp. 23–43.

*Primary Examiner*—Jacques H. Louis-Jacques
*Attorney, Agent, or Firm*—Young & Thompson

[57] ABSTRACT

A safety device for a vehicle includes detection systems, safety mechanisms and safety systems, at least certain of the safety systems including pyrotechnic initiators. When certain of the detection systems detect a danger for a passenger, they trigger safety systems which activate the mechanisms. The safety device also may include a processing unit connected to the detection and safety systems by a communication interface; the processing unit analyses information signals coming from the detection systems and generates command signals directed to the safety systems.

8 Claims, 1 Drawing Sheet

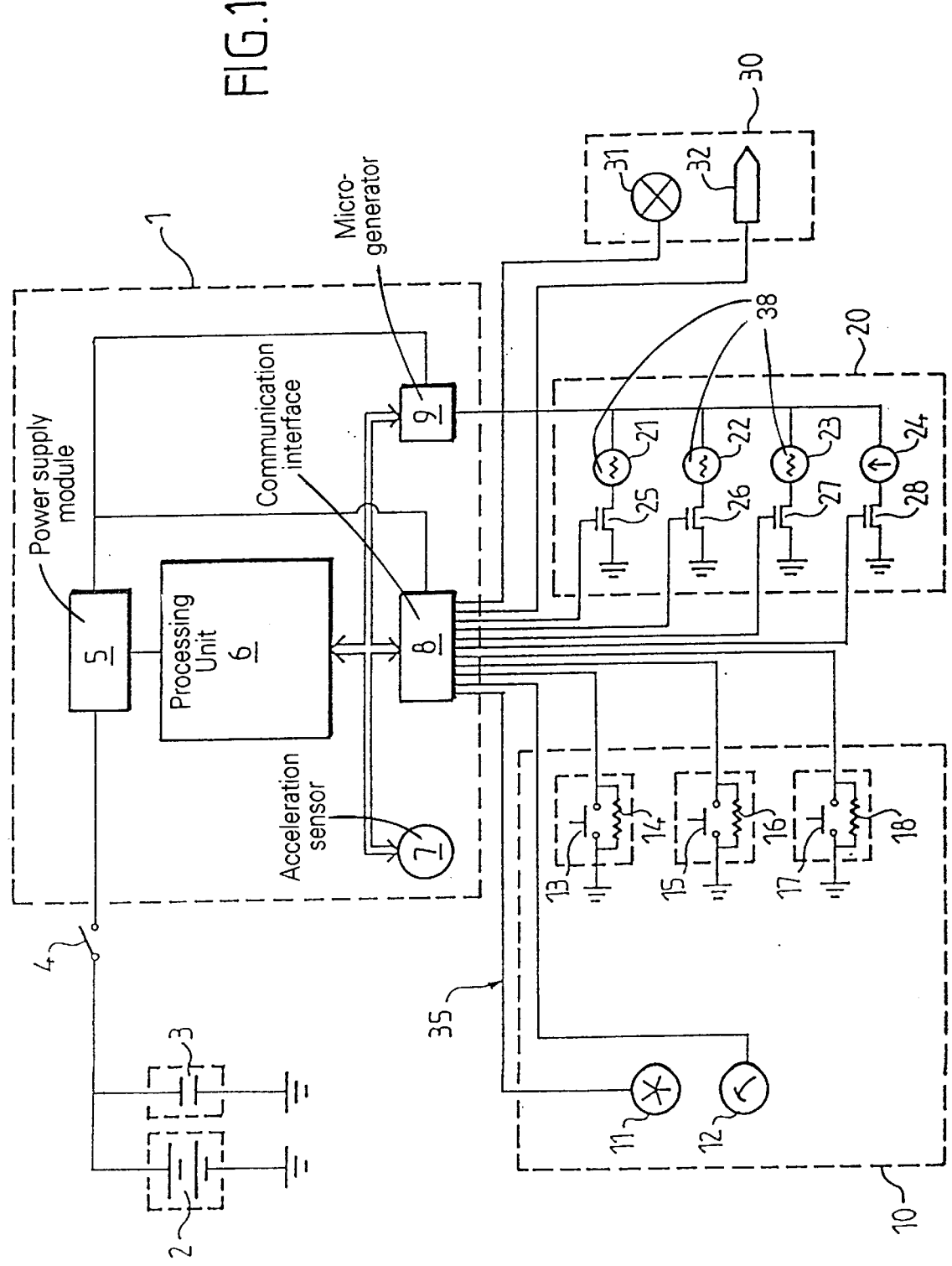

VEHICLE SAFETY DEVICE

BACKGROUND OF THE INVENTION

This invention relates to a safety device applicable to a vehicle, and more particularly to an automobile.

DESCRIPTION OF THE RELATED ART

Pyrotechnic safety devices used in automobiles usually consist of safety circuits made up of an electrical power source supplying a certain voltage to the terminals of a pyrotechnic initiator connected, in series, with one or several acceleration sensors. The initiator having a fixed internal resistance, the sensors are generally shunted by a resistance having a nominal value greater than that of the internal resistance of the initiator. In this way, the initiator has a small current passing through it that is insufficient to cause it to be triggered. When a collision or a large deceleration of the vehicle is detected, one or more sensors are closed successively, causing a large increase in the current passing in the initiator.

The mechanism is then ignited, activating a mechanism which is linked to it. Typically the mechanism is a safety air bag.

A major disadvantage of these safety devices is that they are designed to collect information solely from acceleration sensors. Other important parameters, such as the speed of the vehicle or the level of braking are not taken into account.

Another disadvantage of these devices is that they do not memorise information relating to the conditions of the progress of a journey. They cannot therefore act as a black box in the event of an accident, nor diagnose, with accuracy the source of a breakdown.

Furthermore, these devices impose the simultaneous triggering of the whole of the safety systems provided in a vehicle.

Moreover, the correct operation of elements of the device is verified by ensuring an electrical continuity. This method, usable for resistive elements, is not suitable in the presence of semi-conducting elements. It is therefore not possible to integrate pyrotechnic initiators built around semiconducting bridges.

Another disadvantage appears when there is a fault in one of the sensors linked to an initiator. Usually, coherent information from two acceleration sensors detecting a large deceleration of the vehicle causes ignition of the initiator. If one of the two sensors closes and not the other, the safety device is deactivated. In this way, if a passenger remains safe from a premature or untimely triggering of the safety systems, his safety is no longer guaranteed in the event of a crash.

Also, the existing devices necessitate fixing right from the stalr the elements which are included in it. The sensors and the initiators present in the device must be predetermined in type and in number. It is therefore difficult to integrate them into different vehicles corresponding to distinctive measurement means and safety mechanisms.

Another disadvantage is apparent in the presence of one or several initiators built around semi-conducting bridges. In effect, it is essential to be able periodically to verify their functionality. This is usually called out in an indirect way. A veil, typically of tungsten is deposited on the semi-conducting bridge and its condition is checked. This indirect method has proved to be both rather impractical and only moderately reliable.

SUMMARY OF THE INVENTION

The aim of the invention is to remedy these various disadvantages.

In particular, the aim of the invention is a safety device with a modular architecture, making it possible to modify its elements simply.

Another object of the invention is to keep information about the conditions of a journey in such a way that it is used as a black box and a diagnostic box.

The invention also has the aim of being able to integrate pyrotechnic initiators built around semi-conducting bridges, whilst periodically checking their working condition in a simple way and with high reliability.

Another object of the invention is to be able to sequence precisely the successive triggering of several safety systems.

The invention also aims at a systematic validation of an order of putting a safety mechanism into action.

To this end, the invention provides a safety device for a vehicle comprising:

- detection systems, giving information on the conditions of a journey of a vehicle, these detection systems having a first state, corresponding to normal conditions for the journey, and a second state, corresponding to a danger for at least one passenger in the vehicle,
- mechanisms that can be activated to ensure the safety of this passenger,
- safety systems liable of activating these mechanisms, certain at least of these safety systems comprising pyrotechnic initiators,
- a source of electrical power, and
- an electrical circuit supplied by the source and connected to the detection and the safety systems.

When certain of the detection systems pass from the first to the second state, they trigger the safety systems. The latter then activate the mechanisms.

According to the invention, the safety device comprises a processing unit connected to the detection and safety systems by a communication interface. The processing unit analyses the information signals coming from the detection systems and generates command signals directed to the safety systems.

This configuration permits great flexibility of design and of use. One and the same safety device can then be the subject of particular programming in order to be integrated into vehicles that are differently equipped. Isolated operations on certain elements are particularly simple. Moreover, it is easy to expand the contents of the device.

In one preferred embodiment of the invention, the processing unit comprises a non-volatile memory. This allows the periodic recording of information on the functionality of elements of the safety device.

The integrated non-volatile memory permits storage of information obtained at the time of previous functionality controls of the device. This information is recoverable in the event of a breakdown or an accident, therefore the non-volatile memory serves as a black box and a diagnostic box.

In an advantageous way, the device according to the invention comprises a pulse micro-generator that allows the generation in the circuit of electrical pulses precisely calibrated in time and in amplitude. These pulses allow verification of the functionality of the pyrotechnic initiators.

With the pulse micro-generator present, at least one of the initiators advantageously comprises a semi-conducting bridge. The bridge is an insulator if the voltage applied is less than a conductive threshold value and a conductor if the voltage is greater than this value. Moreover, the initiator is triggered when it receives energy having a value greater than an operational threshold. The pulse micro-generator sends into the initiator voltage pulses having an amplitude at least equal to the conductive threshold value, and a duration corresponding to an energy less than the operational threshold.

In this way, the safety device according to the invention allows verification of several types of initiator operating with very different technologies. The current or voltage pulses supplied by the micro-generator in effect permit measurements both for initiators using a resistive wire or a resistive bridge with a thin layer and for others using a semi-conducting bridge.

The mechanisms of the safety device according to the invention are preferably members of a group comprising frontal and lateral air bags, pretensioners for safety belts, liable of causing traction on the belts, devices for locking and unlocking the doors of the vehicle, a battery cut-out and an extinguisher.

The detection systems of the safety device according to the invention are preferably members of a group comprising accelerometers, a speedometer, tactile sensors, braking indicators, fire detectors and sensors that indicate the presence of passengers.

In a preferred way of implementing the invention, the safety device comprises a redundant acceleration detector with the detection systems. This acceleration sensor is connected to the processing unit and can confirm a danger detected by at least one of the detection systems.

This acceleration sensor is advantageously tri-directional.

The integrated acceleration sensor confirms signals coming from other acceleration sensors on the vehicle. An order for triggering of a mechanism is thereby validated by two sources.

The device according to the invention advantageously comprises means allowing the detection of frontal and lateral collisions.

It is suitable that the processing unit comprises an internal clock permitting periodic verification of the conditions of the journey and sequencing of successive triggering of the safety systems.

This means is particularly suitable for the modular architecture of the safety device according to the invention.

Other advantages of the invention will emerge, which will be better understood with the help of the description given below of one embodiment example, described in a non-limitative way with reference to the appended drawing in which:

BRIEF DESCRIPTION OF THE DRAWINGS

FIG. 1 is a synoptic diagram of a safety device according to the invention.

DESCRIPTION OF PREFERRED EMBODIMENTS

In the embodiment described, the safety device according to the invention comprises an energy source 2 supplying circuit wiring 35 extending into the whole of the device. The energy source 2 is typically a battery of an automobile. It is connected, in parallel, with an energy reservoir 3 intended to remedy a failure of this battery 2 in the event of a crash.

The safety device also comprises a management module 1 permitting analysis of information on the conditions of a journey and commanding the safety mechanisms. The energy source 2 is separated from the management module 1 by a contact switch 4, which allows the device to be switched on and off. The management module 1 is preferably included in an integrated circuit.

The management module 1 is made up of a power supply module 5, a processing unit 6, a pulse micro-generator 9, an integrated acceleration sensor 7 and a communication interface 8.

The power supply module 5 is intended to supply a continuous voltage to the rest of the device, from a voltage supplied by the energy source 2. It is connected to a regulator (not shown).

The processing unit 6 is built around a non-volatile memory and a micro-processor. It permits the reception and analysis of signals representative of the conditions of a journey and allows the sending of command signals intended to activate the safety mechanisms. Thanks to its non-volatile memory, the processing unit 6 also has the function of storing information relating to the journey. The processing unit 6 also comprises an internal clock, which permits periodic verification of the conditions of the journey. The internal clock also ensures the timed sequence of triggering of safety systems activating the mechanisms.

The integrated acceleration sensor 7 is constructed, for example, around a piezo-electric element supplying, to the processing unit 6, a signal that relates to an acceleration of the vehicle. This sensor 7 is tri-directional, in such a way that it is able to confirm a detection of a frontal or lateral collision by another acceleration sensor. To this end, the sensor 7 has a triggering threshold slightly greater than that of the other sensors. Although a bi-directional sensor is sufficient for the detection of frontal and lateral collisions, the use of the tri-directional sensor 7 gives a greater reliability.

The pulse micro-generator 9 permits the generation of electrical pulses that are precisely calibrated in time and in amplitude, serving to measure resistances of conducting or semi-conducting circuits integrated into pyrotechnic initiators of the safety device.

The communication interface 8 allows the management module 1 to receive any information relating to the conditions of the journey, and to transmit commands to safety mechanisms. The communication interface 8 also allows information intended for the user to be supplied.

An information sub-assembly 10 gathers together all information sources necessary for operation of the management module 1. The circuit 35 connects the elements of the information sub-assembly 10 to the communication interface 8.

The sub-assembly 10 comprises a speedometer 11, a braking indicator 12, a sensor 13 intended to detect the presence of a passenger, an accelerometer 15 intended to detect a frontal impact and a tactile sensor 17 liable of detecting a lateral collision. Resistances 14, 16 and 18 are mounted in parallel respectively onto sensors 13, 15 and 17. The sensors 13, 15 and 17 have an open position and a closed position. In the open position, a current passes through the resistances 14, 16 and 18. In the closed position, the sensors 13, 15 and 17 have a substantially lower resistance. Their closing therefore causes a substantially increase in the current passing through circuit wiring 35. This closing is produced automatically in the presence of a front seat passenger for sensor 13, a frontal impact for the accelerometer 15, and a lateral collision for the tactile sensor 17.

The information sub-assembly 10 thereby constitutes an input interface for the management module 1.

An activation sub-assembly 20 gathering together all the elements intended to be activated by the management module 1, as a function of signals sent by the information sub-assembly 10, constitutes an output interface for the management module 1. It comprises three pyrotechnic initiators 21, 22 and 23 connected respectively to seat belt pretensioners, frontal air bags and lateral air bags. These initiators 21, 22, 23 are built around resistive or semi-conductor bridges 38. The sub-assembly 20 also comprises a device 24 for unlocking the doors of the vehicle. The initiators 21, 22, 23 and the device 24 constitute safety systems connected to circuit 35 respectively by transistors 25, 26, 27 and 28. These transistors 25, 26, 27, 28 can be in an open or a closed position. In the open position, a current passing through circuit wiring 35 does not get to the elements 21, 22, 23, 24. In the closed position, the current passes to them and is capable of triggering them. The closing of the transistors 25, 26, 27, 28 is commanded by the processing unit 6 through the communication interface 8.

The initiators 21, 22, 23 and the device 24 are also connected to the pulse micro-generator 9, which periodically checks their functionality.

The safety device also comprises an interface sub-assembly 30 communicating information to a user. This interface sub-assembly 30 is connected to the communication interface 8 of the management module 1 through the connections of circuit wiring 35. It comprises an indicator light 31 positioned on the instrument panel of the vehicle and a reading interface 32 for the purpose of reading information stored in the memory in the processing unit 6. The indicator light 31 has the function of indicating a fault in one of the sensors. The interface 32 enables an evaluation to be made in the event of an accident or for a control operation, thereby carrying out the function of a black box or a diagnostic box.

Before fitting the management module 1 into a vehicle, the processing unit 6 is programmed at the factory in accordance with the configuration of that vehicle. It contains the various parameters required for its operation. These various parameters can be, for example, threshold values for closing the sensors 13, 15 and 17, resistance values of the initiators 21, 22, 23 and of the device 24, electrical pulse values necessary for the operational tests of the latter, or the reference voltage values at different measurement points of circuit wiring 35.

In normal operation, the contact switch 4 is closed at the moment the vehicle is started, making the safety device live. The presence of one or several front passengers causes the closure of sensor 13, which causes an increase in the current passing through circuit 35. The management module 1 detects and interprets this current increase, that is dependent upon the value of the resistance 14.

Periodically, the management module 1 tests the condition of the initiators 21, 22, 23 and of the device 24, using the pulse micro-generator 9. Depending on whether it verifies the functionality of a resistive element or a semi-conductor, the management module 1 proceeds in a different way.

A check of a resistive element, having a fixed value for non-operation, is carried out by applying to its terminals a voltage calibrated by the micro-generator 9, in such a way that a current passing through this resistive element remains less than its value for non-operation. The measurement of the generated current makes it possible to deduce the resistance of the resistive element, which is compared with its reference value stored in the memory of the processing unit 6.

In the case of a semi-conducting element, this is insulating when an applied voltage is less than a conductive threshold value, and a conductor if the voltage is greater than this value. Furthermore, the triggering of a safety system linked to this semi-conductor element is caused by it receiving energy having a value greater than a fixed operational threshold. When checks are being made, the micro-generator 9 sends a voltage pulse with a value equal to or greater than the conductive threshold value for the semi-conducting element, and having a duration sufficiently short for the operational threshold of the semi-conducting element not to be reached.

The management module 1 deduces the resistance of this element which is compared with a reference value. The duration of a pulse, depending on the nature of the semi-conducting element, is typically of the order of a few tens of nanoseconds.

This latter measurement method permits semi-conductors to be tested in an effective way without risk of triggering a safety system in untimely fashion. Hense ignition of a pyrotechnic initiator built around a semi-conducting bridge is avoided, whilst verifying that it is in good condition.

Checks are typically carried out every 100 milliseconds.

The latest results of the controls are stored in the non-volatile memory of the processing unit 6. Several tens of test moments can, for example, be kept, the first records being erased as the new ones are carried out.

The management module also records, in a regular fashion, the speed of the vehicle measured by the speedometer 11, and the braking condition measured by the braking indicator 12.

In this way, the processing unit 6 contains, on a continuous basis, the conditions of the progress of the journey at the latest instants.

Following a frontal impact or a strong deceleration, the accelerometer 15 closes. The management module 1 then detects a substantially increase in the current passing through circuit 35. This is however only interpreted as being representative of a frontal collision if the integrated acceleration sensor 7 closes in its turn. In the event of failure of sensor 7, the management module 1 is liable of analysing information coming from the speedometer 11 in order to calculate a deceleration representative of a collision. If the closure of the accelerometer 15 is not confirmed by information coming from the sensor 7 or from the speedometer 11, it is interpreted as a failure of the sensor 15. The management module 1 then switches on the indicator light 31. The tests stored in the processing unit 6 can then be consulted by means of the reading interface 32 so as to draw up a diagnosis.

On the other hand, if the information coming from the accelerometer 15 is confirmed by the sensor 7 or the speedometer 11, the management module 1 immediately commands the closing of transistors 25 and 26, causing ignition respectively of pyrotechnic initiators 21 and 22. This triggering of the initiators 21 and 22 causes safety belt traction and the release of frontal air bags. A short instant later, determined by the internal clock of the processing unit 6, transistor 28 is closed in its turn, triggering the unlocking of the doors.

In a similar fashion, closing of sensor 17, symptomatic of a lateral collision, must be confirmed by the acceleration sensor 7. If such is the case, the management module 1 commands the closure of transistors 25 and 27. The latter causes the inflation of lateral air bags. Transistor 28 is closed a short instant later, as for a frontal impact.

Following an accident, information recorded in the non-volatile memory of the processing unit 6 can be read by means of the interface 32. The management module 1 also plays the role of a black box. If necessary, this information can be encoded in such a way as to limit access to it to authorised persons.

The modular nature and great flexibility of use of the safety device makes it possible to contemplate without difficulty, the use of other sensors. Hence, it is possible to add to sensors 13, 15 and 17 other sensors of the same type. Several sensors 13 can, for example, indicate individually the presence of passengers in the vehicle. Other types of sensors can also be added to the preceding ones, such as a fire detector.

Similarly, it is possible to provide mechanisms other than those previously described by way of example. Mechanisms of the same type as those described can be added tailoring their effects to individual requirements. For example, several initiators can be provided for separate frontal air bags. Other safety mechanisms can prove to be practical. In particular, a battery cut-out, an extinguisher or a device for locking the doors of the vehicle can be integrated into the activation sub-assembly 20.

In addition, it is conceivable that triggering of the mechanisms may be caused not by an increase but by a decrease of current. Other methods of transmitting signals can be envisaged, such as optical methods.

The reference symbols put in after the technical features mentioned in the claims, have the sole purpose of facilitating the understanding of the latter and do not limit the scope of them in any way.

We claim:

1. A safety device for a vehicle comprising:

detection systems (11, 12, 13, 15, 17), giving information on the conditions of a journey of the vehicle, said detection systems (11, 12, 13, 15, 17) having a first state, corresponding to normal conditions for the journey, and a second state, corresponding to a danger for at least one passenger in the vehicle;

mechanisms that can be activated to ensure the safety of said passengers;

safety systems (21, 22, 23, 24) liable of activating said mechanisms, certain at least of said safety systems (21, 22, 23) comprising pyrotechnic initiators;

a source (2) of electrical power;

an electrical circuit (35) supplied by the source (2) and connected to the detection systems (11, 12, 13, 15, 17) and safety systems (21, 22, 23, 24), such that when certain of the detection systems (11, 12, 13, 15, 17) pass from the first to the second state, they trigger the safety systems (21, 22, 23, 24), said safety systems (21, 22, 23, 24) activating said mechanisms;

a processing unit (6) connected to the detection systems (11, 12, 13, 15, 17) and the safety systems (21, 22, 23, 24) by a communication interface (8), the processing unit (6) analysing the information signals coming from the detection systems (11, 12, 13, 15, 17) and generating command signals directed to the safety systems (21, 22, 23, 24); and a pulse micro-generator (9) permitting the generation in said circuit (35) of electrical pulses, precisely calibrated in time and in amplitude, said pulses allowing the verification of the functionality of the pyrotechnic initiators, wherein at least one of the initiators comprises a semi-conducting bridge, said bridge being insulating when an applied voltage is less than a conductive threshold value and a conductor if the voltage is greater than said value, and said initiator, being triggered when it receives energy having a value greater than an operational threshold, the pulse micro-generator (9) sends into said initiator voltage pulses having an amplitude at least equal to the conductive threshold value, and a duration corresponding to an energy less than the operational threshold.

2. A safety device according to claim 1, wherein the processing unit (6) comprises a non-volatile memory allowing the recording periodically of information on the functionality of elements of the safety device.

3. A safety device according to claim 1, wherein said mechanisms belong to a group comprising frontal and lateral safety air bags, seat belt pretensioners, liable of causing traction of the belts, devices for locking and unlocking the doors of the vehicle, a battery cutout, and an extinguisher.

4. A safety device according to claim 1, wherein said detection systems (11, 12, 13, 15, 17) belong to a group comprising accelerometers (15), a speedometer (11), tactile sensors (17), braking indicators (12), fire detectors and sensors indicating the presence of passengers.

5. A safety device according to claim 1, said detection systems (11, 15, 17) further comprise a redundant acceleration sensor, said acceleration sensor (7) being connected to the processing unit (6) and being able to confirm a danger detected by at least one of said detection systems (11, 15, 17).

6. A safety device according to claim 5, wherein said acceleration sensor (7) is tri-directional.

7. A safety device according to claim 1, further comprising a means (7, 11, 15, 17) permitting the detection of frontal and lateral impacts.

8. A safety device according to claim 1, wherein the processing unit (6) comprises an internal clock, allowing periodic verification of the conditions of the journey and the sequencing of successive triggering of said safety systems (21, 22, 23, 24).

* * * * *